United States Patent [19]

Egli et al.

[11] Patent Number: 4,848,158

[45] Date of Patent: Jul. 18, 1989

[54] SINGLE-AXIS CENTRIFUGAL RATE SENSOR

[75] Inventors: Werner H. Egli; Asbjorn M. Severson, both of Minneapolis, Minn.

[73] Assignee: Honeywell Inc., Minneapolis, Minn.

[21] Appl. No.: 808,362

[22] Filed: Dec. 12, 1985

Related U.S. Application Data

[63] Continuation of Ser. No. 480,659, Mar. 31, 1983, abandoned.

[51] Int. Cl.⁴ .................................................. G01P 3/22
[52] U.S. Cl. ............................................. 73/518; 73/535
[58] Field of Search ............. 73/1 D, 1 DC, 505, 504, 73/510, 512, 517 R, 517 B, 517 A, 518, 535; 364/565

[56] References Cited

U.S. PATENT DOCUMENTS

| | | |
|---|---|---|
| 1,955,111 | 4/1934 | Buckler ................................. 338/45 |
| 2,551,502 | 5/1951 | Montrose-Oster ..................... 73/510 |
| 3,238,432 | 3/1966 | Amberger . | 
| 3,270,566 | 9/1966 | Cenitch et al. . |
| 3,702,078 | 11/1972 | Knausenberger . |
| 3,854,341 | 12/1974 | Quermann . |
| 4,074,580 | 2/1978 | Boltinghouse et al. . |
| 4,098,546 | 7/1978 | Swartz et al. . |
| 4,188,816 | 2/1980 | Mairson ............................ 73/517 R |
| 4,222,272 | 9/1980 | Mairson ............................ 73/517 R |

FOREIGN PATENT DOCUMENTS

| | | | |
|---|---|---|---|
| 460078 | 10/1949 | Canada .................................. 73/518 |
| 719762 | 2/1932 | France .................................. 73/518 |
| 363035 | 2/1973 | U.S.S.R. ................................ 73/518 |

*Primary Examiner*—John Chapman
*Attorney, Agent, or Firm*—William T. Udseth; John G. Shudy, Jr.

[57] ABSTRACT

A single-axis rate sensor for determining angular speed $\dot{\theta}$ in inertial space of an object rotating about the axis. The rate sensor includes a mass, a motor for rotating the mass about the axis at an angular speed $\omega$ relative to the object, and a microcomputer for determining a centrifugal force at a radius R from the axis due to the rotation of the mass about the axis at an angular speed $\Omega$ in inertial space, where $\Omega$ is the sum of $\dot{\theta}$ and $\omega$. Alternative embodiments provide a closed loop system where $\Omega$ is held constant, and a dual rotor arrangement which can be used to reduce a nonlinear factor in a relationship between $\dot{\theta}$ and centrifugal force and/or to provide an in-operation self-checking feature.

4 Claims, 3 Drawing Sheets

SINGLE-AXIS CENTRIFUGAL RATE SENSOR

This application is a continuation of application Ser. No. 480,659, filed Mar. 31, 1983, abandoned.

BACKGROUND OF THE INVENTION

1. Field of the Invention

This invention relates to single-axis rate sensors or gyroscopes, and particularly to rate sensors including synchronous motors.

2. Prior Art

Centrifugal acceleration $a_c$ at radius R from an axis is proportional to the square of the rate of rotation $\Omega$ about such axis, that is:

$$a_c = \Omega^2 R \qquad (1)$$

For slow rates of rotation, $\Omega$ is small and this impedes a precise determination of $\Omega$ from measurements of $a_c$. A linear relationship between $a_c$ and $\Omega$ would be desirable in some cases, or at least a nonlinear relationship wherein the nonlinear terms are precisely known and are of relatively simple form. Prior single-axis rate sensors have not provided simple, easily constructed devices or methods to accommodate these concerns.

SUMMARY OF THE INVENTION

The invention is a single-axis rate sensor for determining the angular speed $\dot{\theta}$ in inertial space of an object rotating about the axis. The rate sensor includes a mass, means for rotating the mass about the axis at an angular speed $\omega$ relative to the object, and means for determining a centrifugal force at a radius R from the axis due to the rotation of the mass about the axis at an angular speed $\Omega$ in inertial space, where $\Omega$ is the sum of $\dot{\theta}$ and $\omega$.

Knowing $\omega$, a relatively simple relationship between the centrifugal force and $\dot{\theta}$ is provided. Further, the relationship involves the product of $\omega$ and $\dot{\theta}$, so that for slow rates (i.e., $\dot{\theta}$ small) a large output (related to centrifugal force) can still be provided by making $\omega$ large. With a synchronous motor, $\omega$ can be kept very constant with respect to the motor frame and thus easily distinguished from $\dot{\theta}$.

Alternative embodiments provide a closed loop system where $\omega$ is held constant, and a dual rotor arrangement which can be used to reduce a nonlinear scale factor in a relationship between $\dot{\theta}$ and centrifugal force or to provide a self-checking feature.

Electrical circuit centrifugal force sensors are also disclosed.

DESCRIPTION OF THE PREFERRED EMBODIMENT

Figure 1:
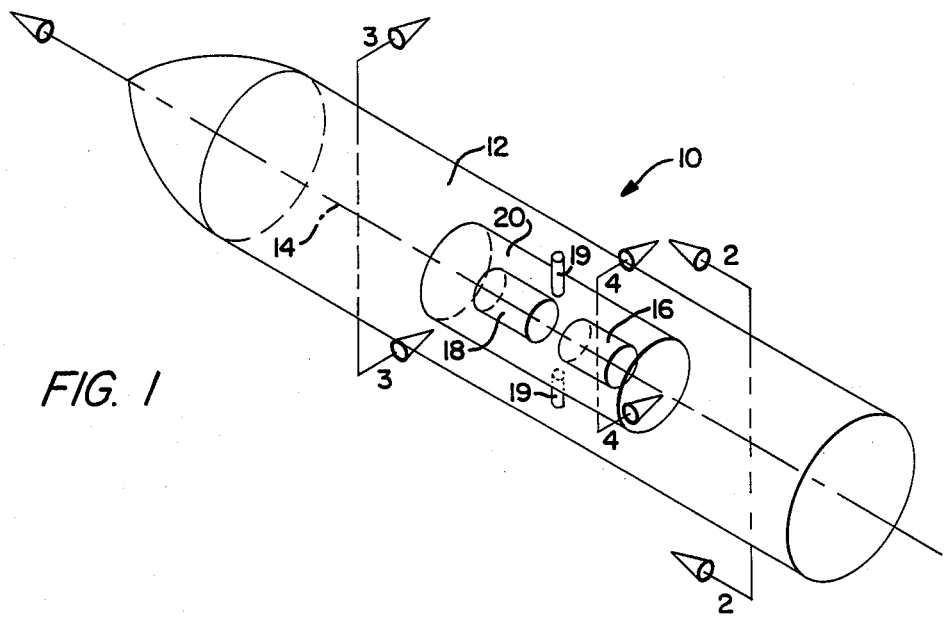
FIG. 1 is a schematic perspective of a vehicle which could carry the invention.
Figure 2:
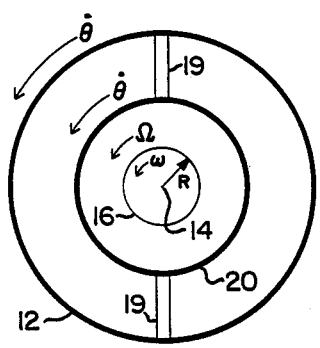
FIG. 2 is a view along line 2—2 of FIG. 1 showing the relationship of $\dot{\theta}$, $\omega$, $\Omega$ and R.

An object such as rocket 10 (see FIG. 1) includes exterior surface 12, and axis 14, first and second masses 16 and 18 which are intercepted by axis 14, and a housing 20 which can contain masses 16 and 18. Housing 20 is secured to surface 12 by supports 19. FIG. 2 shows exterior surface 12 and housing 20 rotating about axis 14 at angular speed $\dot{\theta}$ in inertial space, and mass 16 rotating about axis 14 at angular speed $\omega$ relative to exterior surface 12. The total angular speed $\Omega$ of mass 16 about axis 14 in inertial space is thus the sum of $\omega$ and $\dot{\theta}$ (sum will be used hereinafter to refer to the algebraic sum, with the sign of two angular speeds being understood to be the same if the angular speeds are due to the rotations in the same direction and different if the angular speeds are due to rotations in opposite directions), that is:

$$\Omega = \omega + \dot{\theta} \qquad (2)$$

From equations 1 and 2 it follows that:

$$a_c = R(\omega^2 + 2\omega\dot{\theta} + \dot{\theta}^2) \qquad (3)$$

To determine the change in $a_c$ when $\dot{\theta}$ goes from zero to a nonzero value, one notes that:

$$a_{co}(\dot{\theta}=0) = R\omega^2 \qquad (4)$$

therefore, from equations 3 and 4:

$$a_c - a_{co} = 2\omega R\dot{\theta}(1 + \dot{\theta}/2\omega) \qquad (5).$$

Thus, for R and $\omega$ constant, $a_c$ can be plotted as a linear function of $\dot{\theta}$ except for a fractional nonlinear factor of $\dot{\theta}/2\omega$. For $\dot{\theta}$ small compared to $\omega$ (i.e., the low rate case or the case where $\omega$ is large), this nonlinear factor is not important. Correction of the nonlinear factor, when the factor is of interest, will be discussed further below.

Figure 3:
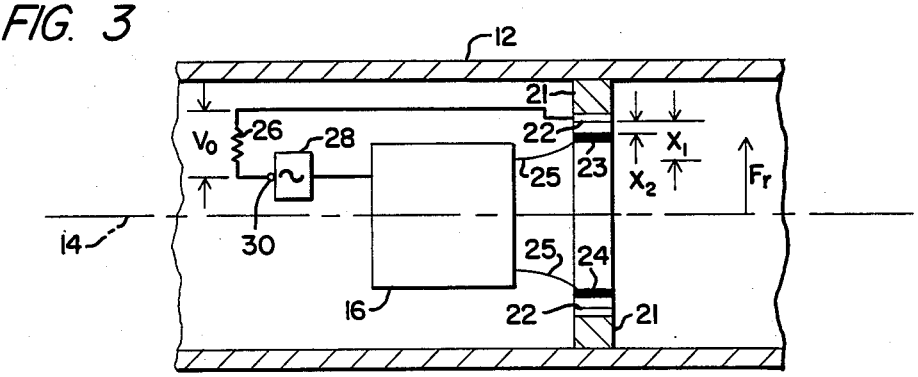
FIG. 3 is a partial, enlarged view along line 3—3 of FIG. 1 and further including one of the centrifugal force sensors of the present invention.

FIG. 3 illustrates a first embodiment of an electrical circuit centrifugal acceleration or centrifugal force sensor. Therein, a capacitor is formed between capacitive members or "plates" 22 and 23, and between plates 22 and 24. Plate 22 is preferably wrapped around the inside diameter of casing 12 and is electrically insulated from casing 12 by insulator 21. Plate 22 is spaced uniformly at distance X1 from plates 23 and 24 when $\omega$ is zero. Plates 23 and 24 are each connected to rotating mass 16 by a member 25 which is adapted to respond or flex in response to forces perpendicular to axis 14. Thus, for example, under a given radial force $\vec{F}_r$, member 25 will flex towards casing 12 and the separation between plates 23 and 24 will be reduced to X2. This in turn will alter, for example, an output voltage VO across a resistance 26. Device 28 represents an alternating current voltage supply which has one pole connected to a reference point 30 in rocket 10. The larger the radial force $\vec{F}_r$, the smaller X2 and the larger the variation in VO.

Figure 4:
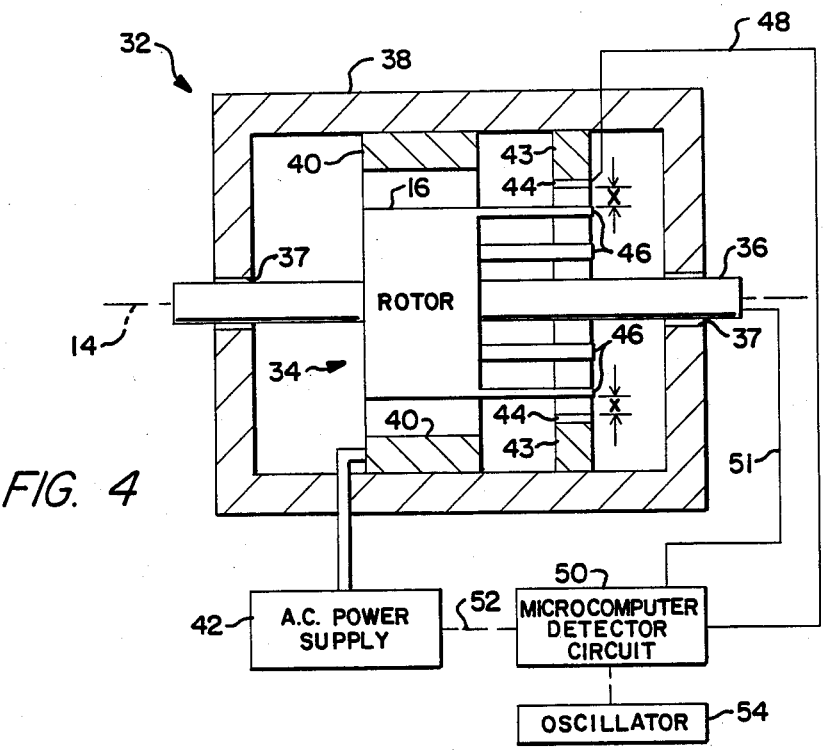
FIG. 4 depicts a first embodiment of the present invention with one synchronous motor, and either an open or closed looped system.

FIG. 4 illustrates a first embodiment of a single axis rate sensor employing a rotating mass such as mass 16. Therein, device 32 includes a means for rotating (such as synchronous motor 34) a mass 16 such as a rotor, about an axis 14. Axis 14 is aligned concentrically with shaft 36 which is rotatably supported by sleeve bearing 37 and casing 38. Drive coils 40 are energized by a.c. power supply 42. An electrical circuit similar to that of FIG. 3 which allows an electrical parameter of a component to vary in response to forces perpendicular to axis 14 is incorporated in device 32. In particular, capacitive member 44 is circular, is electrically insulated from casing 38 by insulator 43 and is wrapped around the inside diameter of casing 38. A plurality of flexible elements 46 extend parallel to axis 14 from rotor 16 so that when there are no forces perpendicular to axis 14, a portion of each element 46 is spaced a distance X from capacitive member 44. Elements 46 are also adapted to hold charge when a voltage appears between elements 46 and capacitive member 44, so that a capacitance is provided between elements 46 and member 44. Casing 38 is itself mounted to the exterior surface 12 of vehicle 10 so that like housing 20 of FIG. 2, it will rotate in inertial space about axis 14 at $\dot{\theta}$. An electrical signal line 48 connected to capacitive member 44 provides a means for extracting electrical signals from the capacitor formed by member 44 and fingers 46. Line 48 can lead to a microcomputer and/or detector circuit 50. Line 51 completes a circuit to shaft 36.

In operation, device 32 will drive rotor-mass 16 at a synchronous speed $\omega$ which will be a constant relative to exterior casing 38. Elements 46 will flex under the centrifugal force due to $\omega$ providing a first separation between capacitive member 44 and element 46 and a corresponding capacitance signal to detector circuit 50. When $\dot{\theta}$ is not zero, the angular speed in inertial space $\Omega$ of rotor 34 about axis 14 will be different from $\omega$ according to equation 2, and therefore the centrifugal force about axis 14 will vary and the separation between capacitive member 44 and elements 46 will vary, providing a variation in the output signal at detector circuit 50. The output signal of detector circuit 50 corresponds to the centrifugal acceleration, $a_c$. Therefore utilizing equation 5, and knowing $\omega$ and R, $\dot{\theta}$ is readily provided. A microcomputer incorporated with a detector circuit 50 may be advantageously employed to generate or display $\dot{\theta}$ alone or as a function of $a_c$.

Since equation 5 indicates that $a_c - a_{co}$ is directly proportional to the product of $\omega$ and $\dot{\theta}$ (ignoring nonlinearity), a large $\omega$ (relative to $\dot{\theta}$) will increase the output of detector 50 over the output if $\omega$ were zero. This in turn will generally enhance determinations of $\dot{\theta}$.

FIG. 4 also shows a modification of the first embodiments. In the modification, the first embodiment is converted to a closed loop system. The output from detector circuit 50 can be fed back to the a.c. power supply and by use of the microcomputer or other electronic devices, the a.c. drive frequency can be adjusted so that $\Omega$ is constant. Thus, instead of having a variable total inertial rotation rate $\Omega$ and a constant relative spin rate $\omega$, this modification of the first embodiment provides a constant total inertial rotation rate $\Omega$ and a variable spin rate $\omega$. By using a synchronous motor, one can dispense with an explicit revolution-counting pickoff, and instead monitor the frequency of a.c. cycles used to drive the motor.

Thus, when $\dot{\theta}$ decreases, the value of $\omega$, and hence the frequency of the a.c. power supply will increase so as to keep $\Omega$ constant.

The frequency could be adjusted by noting that:

$$\dot{\theta} = \frac{4\pi(f - f_o)}{P} \tag{6}$$

where f equals actual frequency of the power supply, $f_o$ equals the nominal frequency of the power supply and P equals the number of poles in the synchronous motor. Equation 6 can thus be rewritten as:

$$\Delta f = f - f_o = \frac{P\dot{\theta}}{4\pi} \tag{7}$$

For $\Delta$ f small, however, simple digital cycle counting may take several minutes to notice rate step changes as low as one degree per second. Therefore, it may be advantageous to employ a frequency-division scheme to produce the a.c. power supply 42. For example, an oscillator 54 could run at 100,000 hertz as a nominal frequency. Using frequency division, a ratio of 2,000 to 1 could be provided to produce a 50 hertz nominal drive. The scale factor (i.e., the counts per revolution for a given frequency division for a synchronous motor) is given by:

$$\frac{PN_D}{2} \tag{8}$$

where,
P is the number of poles, and
$N_D$ is the frequency division factor.

Thus for a six pole motor at the above frequency and division factor, 6,000 counts per revolution is provided. A logic circuit (not shown) would compare the drive oscillation with a reference oscillation of exactly 100,000 hertz (provided for example by crystal oscillator 54), and would subtractively merge the two sets of pulses. Excess pulses could be emitted through an upcount or downcount line, depending on whether the drive oscillator had generated a surplus pulse or if it had lagged a pulse. The output from the upcount or downcount line would then be utilized to adjust the frequency of the synchronous motor.

Figure 5:
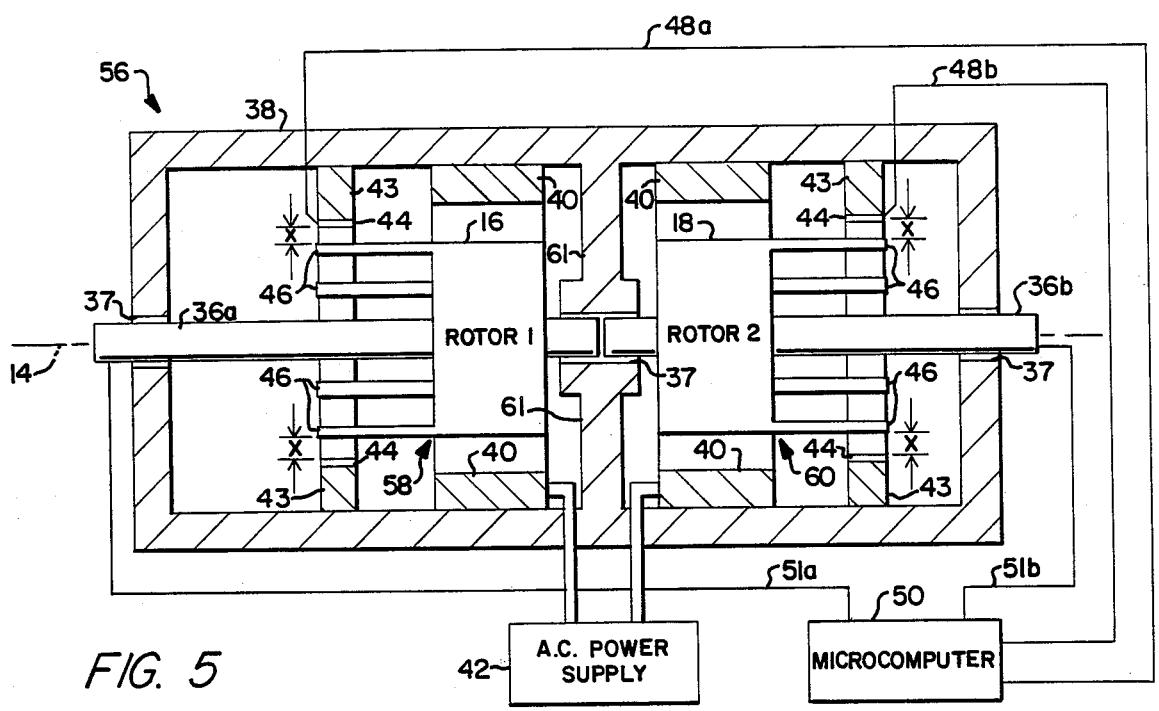
FIG. 5 depicts a second embodiment of the present invention with two synchronous motors.

FIG. 5 shows a second embodiment 56 of the present invention where two, preferably identical, coaxial, counter-rotating synchronous motors 58 and 60 are provided. Similar structure between FIGS. 4 and 5 are numbered the same for clarity, and like numbered structure is the same unless otherwise indicated. Supports 61 are provided to support counter-rotating shafts 36a and 36b.

Rotor 16 will rotate with $+\omega$ and rotor 18 will rotate with $-\omega$. Then $\dot{\theta}$ is derived from the difference between outputs along lines 48A and 48B by microcomputer 50. Specifically, the centrifugal accelerations due to rotors 16 and 18 are $R(\omega+\dot{\theta})$ and $R(\omega-\dot{\theta})^2$, respectively, and their difference is 4R $\omega\dot{\theta}$. Device 56 can be self-checking by reversing one of rotors 16 or 18 and checking to see that the outputs are identical. Any difference is corrected by using a null adjusted bias (not shown). Another embellishment would be to check for identical centrifugal sensor performance. This would be done by running the single drive frequency supplied by power supply 42 up and down through various values, and examining the centrifugal sensors signal differential to see if it remains at zero when $\dot{\theta}$ is zero. If the centrifugal sensors signal differential is not zero and tracks the drive frequency, another means for adjusting the output of lines 48A, 48B (not shown) can be automatically controlled by the microcomputer to give a zero signal differential output through the drive voltage frequency spectrum. This offers an easy method of verifying in-flight, strap-down gyroscope operation in a matter of seconds.

As discussed above, correction of the nonlinear factor $\dot{\theta}/2\omega$ in equation 5 is sometimes desirable. Two methods of correcting for the nonlinear factor can be easily incorporated in devices 32 or 56.

The first method would be to program microcomputer 50 with equation 5. Development of the program itself would be clear to those skilled in the art.

The second method would be to employ the dual synchronous motor configuration of device 56. For a more general approach, suppose that the two nonlinear factors related to motors 58 and 60 are slightly different, and that there is a bias (i.e., an output from device 56 when $\dot{\theta}$ is zero). The different nonlinear factors can be represented by two different coefficients A and B in place of R in equation 3. Thus, the output signal S, including a bias output C, can be represented as follows:

$$S = \Omega^2 A - \Omega^2 B + C \quad (9)$$
$$= A(\omega^2 + \dot{\theta}^2 + 2\omega\dot{\theta}) - B(\omega^2 + \dot{\theta}^2 - 2\omega\dot{\theta}) + C \quad (10)$$
$$= (A - B)(\omega^2 + \dot{\theta}^2) + 2\omega(A + B)\dot{\theta} + C \quad (11)$$

Assuming that device 60 also has a bias adjust function, the output S will be zeroed at the known zero input rate, i.e. C will be adjusted so that:

$$C + (A - B)\omega^2 = 0 \quad (12).$$

Hence the bias-adjusted output signal S is given by:

$$S = (A - B)\dot{\theta}^2 + 2\omega\dot{\theta}(A + B) \quad (13)$$

or $$S = 2\omega(A + B)\dot{\theta}\left(1 + \left(\frac{A - B}{A + B}\right)\frac{\dot{\theta}}{2\omega}\right) \quad (14)$$

Note further that if device 56 has been calibrated for the actual scale factor which is $2\omega(A+B)$ or, if $A=B=R$, $4\omega R$, the calibrated output signal $\overline{S}^*$ will be given by:

$$S^* = \dot{\theta}\left(1 + \left(\frac{A - B}{A + B}\right)\frac{\dot{\theta}}{2\omega}\right) \quad (15)$$

Thus, the fractional nonlinearity of equation 5 is reduced by a factor of $(A-B)/(A+B)$ by utilizing the twin synchronous motor configuration of device 56 as opposed to the single motor configuration of device 32.

Figure 6:
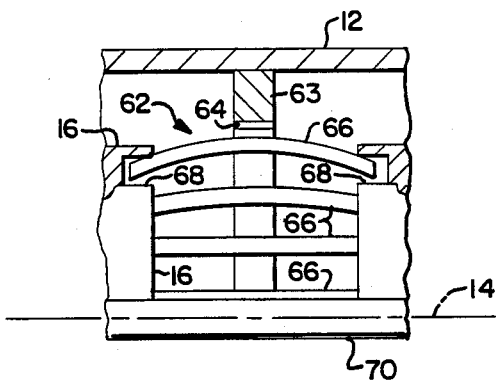
FIG. 6 shows a half cross-section view of an alternative embodiment of a centrifugal force sensor along line 4—4 of FIG. 1.
Figure 7:
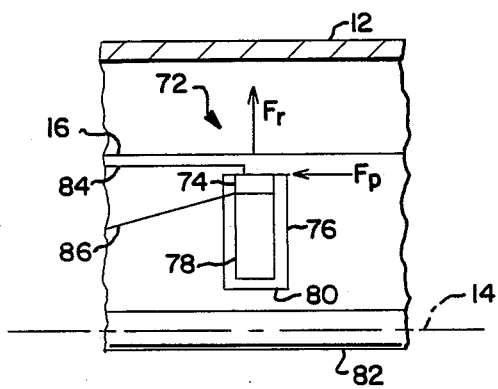
FIG. 7 shows a half cross-section view of a further alternative embodiment of a centrifugal force sensor along line 4—4 of FIG. 1.

The centrifugal force sensor of FIG. 3 is but one means for determining a centrifugal force at a radius R from axis 14 due to the rotation of the centrifugal force sensor about axis 14. FIGS. 6 and 7 show two other centrifugal force sensors. In FIG. 6, sensor 62 is comprised of an insulator 63 and a capacitive member 64 which is of the same structure as capacitive member 44 of FIGS. 4 and 5. However, instead of utilizing elements 46 which are free at one end, a "squirrel cage" arrangement is provided with the radial movement of elements 66 limited at both ends. In FIG. 6, the limitation on movement is provided by setting the ends of elements 66 in notches 68 in a rotor such as rotor 16. Elements 66 will flex in the middle and move away from axis 14 as rotor 68 is rotated about shaft 70.

FIG. 7 presents centrifugal force sensor 72 which includes a piezo-resistive material 74. The piezo-resistive material 74 will be adapted, either employing an anisotropic structure or compensating circuitry, to vary the piezo-resistive elements resistance in response to forces perpendicular to axis 14, such as radial force $\vec{F_r}$, yet the resistance thereof will remain substantially unaffected by forces parallel to axis 14 such as force $\vec{F_p}$. For example, piezo-resistive material 74 can be inserted in a channel 76 in a rotor such as rotor 16, with a mass plug 78 freely positioned between piezo-resistive material 74 and interior surface 80 of channel 76. Plug 78 is sized so that the combined length of plug 78 and piezo-resistive material 74 is less than the length of channel 76. As shaft 82 rotates about axis 14, plug 78 will press on material 74 along a line perpendicular to axis 14, and, combined with the centrifugal force on material 74 due to its own mass, produce radial force $\vec{F_r}$. Material 74 will generate a signal in an appropriate detector circuit by way of conducting means 84 and 86.

What is claimed is:

1. A single-axis rate sensor for determining the angular speed $\dot{\theta}$ in inertial pace of an object rotating about said axis, comprising:
    a first mass;
    first means coupled to said object for rotating said first mass about said axis at an angular speed $\Omega$, relative to said object;
    first means for determining a centrifugal force at a radius R from said axis due to rotation of said first mass about said axis at an angular speed $\Omega$, in inertial space, where $\Omega$, is the sum of $\omega$ and $\dot{\theta}$; and
    wherein said first means for determining the centrifugal force has an output, and said device further includes a means for adjusting $\omega$ with said output, so that said centrifugal force, and therefore also $\Omega$ remains constant.

2. A method of determining an angular speed $\dot{\theta}$ in inertial space of an object rotating about an axis, comprising:
    coupling a first mass to said object so that said mass rotates about said axis at an angular speed $\dot{\theta}$ due to the rotation of said object;
    rotating said first mass about said axis at an angular speed $\omega$ relative to said object;
    determining a first centrifugal force at a radius R from said axis due to rotation of said first mass about said axis at an angular speed $\Omega$ in inertial space, where $\Omega$ is the sum of $\omega$ and $\dot{\theta}$; and
    adjusting $\omega$ with said determined centrifugal force to keep said centrifugal force, and therefore also $\Omega$ constant.

3. A single-axis rate sensor for determining the angular speed $\dot{\theta}$ in inertial space of an object rotating about said axis, comprising:
    a first mass;
    first means mounted on said object for rotating said first mass about said axis at an angular speed $\omega 1$ relative to said object;
    first means for determining a centrifugal force at a radius R1 from said axis due to rotation of said first mass about said axis at an angular speed $\Omega 1$ in inertial space, where $\Omega 1$ is the sum of $\omega 1$ and $\dot{\theta}$;
    a second mass;

second means mounted on said object for rotating said second mass about said axis at an angular speed $\omega_2$ relative to said object;

second means for determining a centrifugal force at a radius R2 from said axis due to rotation of said second mass about said axis at an angular speed $\Omega_2$ in inertial space, where $\Omega_2$ is the sum of $\omega_2$ and $\dot{\theta}$, wherein said first and second masses are rotated in opposite directions about said axis, $\omega_1 = -\omega_2$, and said first and second masses are substantially equal;

means for generating the difference between the centrifugal acceleration due to said first mass and the centrifugal acceleration due to said second mass, wherein A and B are coefficients characteristic of said centrifugal acceleration of said first mass and said centrifugal acceleration of said second mass, respectively, according to:

$$S = \Omega_1^2 A - \Omega_2^2 B + C,$$

where C is the negative of said difference when $\dot{\theta}$ is zero;

further including means for determining C; and
further including means for determining $\dot{\theta}$ from:

$$S = 2\omega_1 (A + B) \dot{\theta} \left( 1 + \left( \frac{A - B}{A + B} \right) \frac{\dot{\theta}}{2\omega_1} \right),$$

where C is set equal to $(B - A)\omega_1^2$.

4. A method of determining an angular speed $\dot{\theta}$ in inertial space of an object rotating about an axis, comprising:

coupling a first mass to said object so that said first mass rotates about said axis at an angular speed $\dot{\theta}$ due to the rotation of said object;

rotating said first mass about said axis at an angular speed $\omega_1$ relative to said object;

determining a first centrifugal force at a radius R1 from said axis due to rotation of said first mass about said axis at an angular speed $\Omega_1$ in inertial space, where $\Omega_1$ is the sum of $\omega_1$ and $\dot{\theta}$;

coupling a second mass to said object so that said second mass rotates about said axis at an angular speed $\dot{\theta}$ due to the rotation of said object;

rotating said second mass about said axis at an angular speed $\omega_2$ relative to said object, wherein said second mass is rotated in a direction opposite the rotation of said first mass;

determining a second centrifugal force at a radius R2 from said axis due to rotation of said second mass about said axis at an angular speed $\Omega_2$ in inertial space, where $\Omega_2$ is the sum of $\omega_2$ and $\dot{\theta}$;

setting $\omega_1 = -\omega_2$;

setting said first and second masses substantially equal;

generating the difference between the centrifugal acceleration due to said first mass and the centrifugal acceleration due to said second mass, wherein A and B are coefficients characteristic of said centrifugal acceleration of said first mass and said centrifugal acceleration of said second mass, respectively, according to:

$$S = \Omega_1^2 A - \Omega_2^2 B + C,$$

where C is the negative of said difference when $\theta$ is zero;

setting C equal to $(B - A)\omega_1^2$; and
determining $\dot{\theta}$ from:

$$S = 2\omega_1 (A + B) \dot{\theta} \left( 1 + \left( \frac{A - B}{A + B} \right) \frac{\dot{\theta}}{2\omega_1} \right).$$

* * * * *